(12) United States Patent
Esam et al.

(10) Patent No.: US 10,356,005 B1
(45) Date of Patent: Jul. 16, 2019

(54) NETWORK SWITCH AWARE MIGRATION OF VIRTUAL RESOURCES

(71) Applicant: EMC Corporation, Hopkinton, MA (US)

(72) Inventors: Mohamed Esam, New Cairo (EG); Adel Zalok, New Cairo (EG); Mohammed Hashem, New Cairo (EG); Farah Thakeb, New Cairo (EG); Dina Helmy, New Cairo (EG); Eslam ElNakib, New Cairo (EG)

(73) Assignee: EMC IP Holding Company LLC, Hopkinton, MA (US)

(*) Notice: Subject to any disclaimer, the term of this patent is extended or adjusted under 35 U.S.C. 154(b) by 572 days.

(21) Appl. No.: 15/166,741

(22) Filed: May 27, 2016

(51) Int. Cl.
*H04L 12/911* (2013.01)
*H04L 12/26* (2006.01)

(52) U.S. Cl.
CPC ........ *H04L 47/745* (2013.01); *H04L 43/0888* (2013.01); *H04L 47/822* (2013.01)

(58) Field of Classification Search
CPC .. H04L 47/745; H04L 47/822; H04L 43/0888
USPC ........................................ 709/223, 224, 226
See application file for complete search history.

(56) References Cited

U.S. PATENT DOCUMENTS

| | | | |
|---|---|---|---|
| 6,788,692 B1* | 9/2004 | Boudreau | H04L 45/46 370/228 |
| 7,284,067 B2 | 10/2007 | Leigh | |
| 7,962,647 B2 | 6/2011 | Suri et al. | |
| 8,102,781 B2 | 1/2012 | Smith | |
| 8,199,655 B2* | 6/2012 | Kakadia | H04L 12/462 370/237 |
| 2006/0069761 A1 | 3/2006 | Singh et al. | |
| 2015/0006705 A1 | 1/2015 | Antony | |

(Continued)

OTHER PUBLICATIONS

M. Mishra et al., "On Theory of VM Placement: Anomalies in Existing Methodologies and Their Mitigation Using a Novel Vector Based Approach," IEEE International Conference on Cloud Computing (CLOUD), Jul. 2011, pp. 275-282.

(Continued)

*Primary Examiner* — Chirag R Patel
*Assistant Examiner* — Marshall M McLeod
(74) *Attorney, Agent, or Firm* — Ryan, Mason & Lewis, LLP

(57) ABSTRACT

An apparatus comprises a plurality of host devices each implementing one or more virtual resources that are migratable between the host devices, one or more networks comprising a plurality of network switches each coupled to one or more of the host devices, and a migration controller associated with one or more of the host devices. The migration controller is configured to monitor utilization of the network switches by their associated host devices and to direct migration of the virtual resources between the host devices based at least in part on the monitored utilization of the network switches. Responsive to detection of a first network switch having a utilization above a threshold, the migration controller identifies a second network switch having a utilization below the threshold and directs migration of at least one virtual resource from a first host devices associated with the first network switch to a second host device associated with the second network switch.

20 Claims, 3 Drawing Sheets

(56) References Cited

U.S. PATENT DOCUMENTS

2015/0074262 A1* 3/2015 Antony ............... H04L 47/125
709/224

OTHER PUBLICATIONS

A. Singh et al., "Server-Storage Virtualization: Integration and Load Balancing in Data Centers," International Conference for High Performance Computing, Networking, Storage and Analysis, Nov. 2008, 12 pages.

M. Liaqat et al., "Virtual Machine Migration Enabled Cloud Resource Management: A Challenging Task," arXiv:1601.03854v1, Jan. 2016, 7 pages.

M. Nelson et al., "Fast Transparent Migration for Virtual Machines," Proceedings of the USENIX Annual Technical Conference, Apr. 2006, pp. 391-394.

A.K. Sidhu et al., "Analysis of Load Balancing Techniques in Cloud Computing," International Journal of Computers & Technology, Mar.-Apr. 2013, pp. 737-741, vol. 4, No. 2.

W. Voorsluys et al., "Cost of Virtual Machine Live Migration in Clouds: A Performance Evaluation," Proceedings of the 1st International Conference on Cloud Computing (CloudCom), Dec. 2009, pp. 254-265.

Y. Manaka et al., "On Live Migration and Routing Integration for Delay-Sensitive Cloud Services in Wireless Mesh Networks," IEEE International Conference on Communications (ICC), Jun. 2015, pp. 454-459.

\* cited by examiner

NETWORK SWITCH AWARE MIGRATION OF VIRTUAL RESOURCES

FIELD

The field relates generally to information processing systems, and more particularly to virtual resources in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system. However, significant challenges can arise in the deployment of virtual machines, containers and other types of virtual resources. For example, it can be difficult under certain conditions to determine an appropriate migration of a virtual machine or container from one host device to another. Inappropriate migrations can adversely impact system performance.

SUMMARY

Illustrative embodiments provide techniques for efficient migration of virtual machines, containers or other virtual resources between host devices. Such techniques in some embodiments involve controlling migration based at least in part on monitored utilization of network switches associated with the host devices as well as monitored utilization of the host devices themselves. This type of arrangement can advantageously avoid a situation in which, for example, a virtual resource is migrated to a host device that has a relatively low utilization level but is coupled to a congested network switch. Accordingly, illustrative embodiments can eliminate migrations that might otherwise adversely impact system performance by inadvertently leading to overload conditions on one or more network switches.

In one embodiment, an apparatus comprises a plurality of host devices each implementing one or more virtual resources that are migratable between the host devices, one or more networks comprising a plurality of network switches each coupled to one or more of the host devices, and a migration controller associated with one or more of the host devices. The migration controller is configured to monitor utilization of the network switches by their associated host devices and to direct migration of the virtual resources between the host devices based at least in part on the monitored utilization of the network switches.

For example, responsive to detection of a first network switch having a utilization above a threshold, the migration controller identifies a second network switch having a utilization below the threshold and directs the migration of at least one of the virtual resources from a first one of the host devices associated with the first network switch to a second one of the host devices associated with the second network switch.

In some embodiments, the migration controller is configured to identify the second host device as a host device having a minimum memory utilization among multiple ones of the host devices associated with the second network switch.

Also by way of example, the migration controller in an illustrative embodiment is configured to determine utilization of each of the network switches in each of a plurality of time periods, and responsive to at least one of the network switches having a utilization above the threshold for at least one of the time periods, to identify a most-utilized one of the network switches and a least-utilized one of the network switches.

The migration controller is illustratively also configured to identify the host devices associated with the most-utilized network switch, to identify the host devices associated with the least-utilized network switch, to select a virtual resource from a given one of the host devices associated with the most-utilized network switch, and to direct migration of the selected virtual resource from the given host device associated with the most-utilized network switch to a given one of the host devices associated with the least-utilized network switch.

The migration controller in selecting a virtual resource from a given one of the host devices associated with the most-utilized network switch may be further configured to identify the host device having a highest network throughput of the host devices associated with the most-utilized network switch, to identify virtual resources of the host device having the highest network throughput of the host devices associated with the most-utilized network switch, and to select from the identified virtual resources the virtual resource having the highest network throughput.

The migration controller in directing migration of the selected virtual resource from the given host device associated with the most-utilized network switch to a given one of the host devices associated with the least-utilized network switch may be further configured to identify the host device having a lowest memory utilization of the host devices associated with the least-utilized network switch, and to direct migration of the selected virtual resource from the host device having the highest network throughput of the host devices associated with the most-utilized network switch to the host device having the lowest memory utilization of the host devices associated with the least-utilized network switch.

As noted above, illustrative embodiments described herein provide significant improvements relative to conventional arrangements. For example, in some of these embodiments, network switch overloading attributable to migration of virtual machines or containers from one host device to another is avoided. Such arrangements advantageously allow for significantly more efficient use of available compute and network resources within a given data center or other type of information processing system.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as multi-tenant environments.

Figure 1:
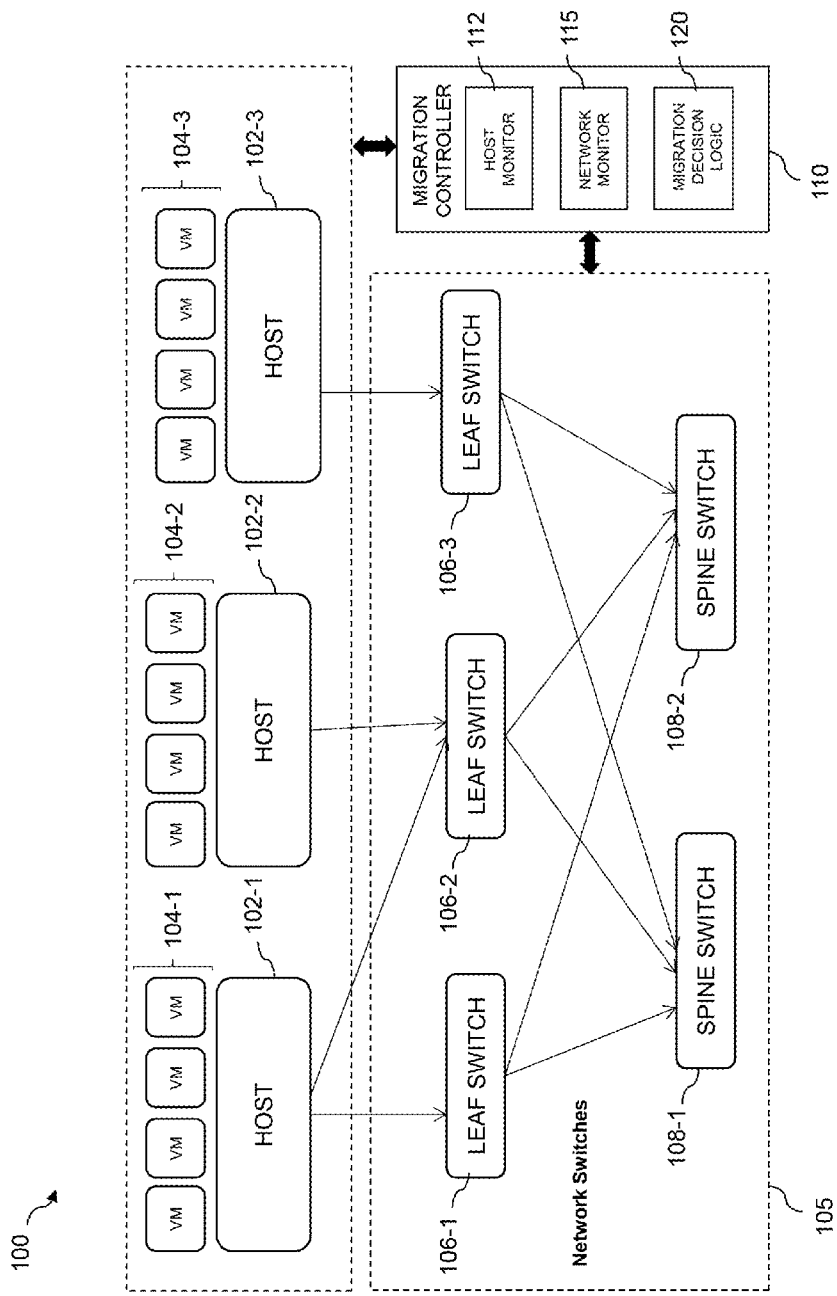
FIG. 1 shows an information processing system configured to support network switch aware migration of virtual resources between host devices in an illustrative embodiment.

FIG. 1 shows an information processing system 100 configured in accordance with an illustrative embodiment. The system 100 comprise a plurality of host devices 102-1, 102-2 and 102-3 each implementing one or more virtual resources that are migratable between the host devices 102. In this embodiment, the virtual resources of the host devices 102 illustratively comprise virtual machines or VMs 104, although containers or other types of virtual resources, or various combinations of such virtual resources, can be used in other embodiments. The host devices 102-1, 102-2 and 102-3 more particularly comprise respective sets of virtual machines 104-1, 104-2 and 104-3. As noted above, the virtual machines 104 are assumed to be individually migratable between the host devices 102.

The system 100 further comprises one or more networks 105 comprising a plurality of network switches each coupled to one or more of the host devices 102. The network switches in this embodiment illustratively comprise leaf switches 106-1, 106-2 and 106-3, each of which is coupled to one or more of the host devices 102. The leaf switches 106 in this embodiment are more particularly assumed to comprise respective Ethernet switches that are directly connected to one or more of the host devices 102. Such switches are also referred to herein as edge switches of the one or more networks 105. The one or more networks 105 further comprise additional switches comprising spine switches 108-1 and 108-2. Each of the spine switches 108 is coupled to one or more of the leaf switches 106. The spine switches 108 are also referred to herein as core switches of the one or more networks 105. It is to be appreciated that the particular types and arrangements of network switches 106 and 108 shown in the FIG. 1 embodiment are presented by way of illustrative example only, and numerous other types and arrangements of network switches of one or more networks may be used in other embodiments.

Also included in the system 100 is a migration controller 110. The migration controller 110 supports what is referred to herein as "network switch aware migration" of the virtual machines 104 between the host devices 102. Such migration illustratively comprises live migration of the virtual machines 104, although other types of migration, including offline migration, can be provided in a similar manner.

The migration controller 110 is illustratively coupled to or otherwise associated with the host devices 102 and the one or more networks 105. The migration controller 110 comprises a host monitor 112, a network monitor 115 and migration decision logic 120. The host monitor 112 of the migration controller 110 is configured to monitor utilization of the host devices 102 by their respective virtual machines 104. The network monitor 115 of the migration controller 110 is configured to monitor utilization of the leaf switches 106 by their associated host devices 102. The migration decision logic 120 is utilized by the migration controller 110 to direct migration of the virtual machines 104 between the host devices 102 based at least in part on the monitored utilization of the host devices 102 and the monitored utilization of the leaf switches 106.

Although in this embodiment the network monitor 115 monitors only the leaf switches 106 that are directly connected to the host devices 102, other embodiments can involve monitoring the utilization of additional or alternative network switches.

The migration controller 110 in the FIG. 1 embodiment is illustrated as being separate from the host devices 102 and one or more networks 105, but at least portions of the migration controller 110 in other embodiments can be implemented in a distributed manner over at least a subset of these system elements. For example, in some embodiments, the migration controller 110 can be implemented in a distributed manner over the host devices 102. In one possible arrangement of this type, a given one of the host devices 102 illustratively comprises at least one processor coupled to at least one memory, with a corresponding portion of the migration controller 110 being implemented by the at least one processor executing software stored in the at least one memory.

The migration decision logic 120 of the migration controller 110 is configured to implement decisions regarding migration of the virtual machines 104 between the host devices 102. For example, responsive to detection of a first one of the leaf switches 106 having a utilization above a threshold, the migration decision logic 120 identifies a second one of the leaf switches 106 having a utilization below the threshold and directs the migration of at least one of the virtual machines 104 from a first one of the host devices 102 associated with the first one of the leaf switches 106 to a second one of the host devices 102 associated with the second one of the leaf switches 106. Numerous other migration scenarios can be carried out in the system 100 under the control of the migration controller 110.

The migration controller 110 is illustratively configured to monitor utilization of the leaf switches 106 by their associated host devices 102 by determining an average utilization of each leaf switch 106 over a particular time period. The migration controller 110 can then detect the first one of the leaf switches 106 having a utilization above a threshold by comparing the average utilization of that leaf switch determined for a particular time period to an average utilization threshold. The second one of the leaf switches 106 having a utilization below the threshold is determined in a similar manner.

The migration controller 110 can identify the second one of the host devices 102 as the host device having a minimum memory utilization among the host devices 102 associated with the second one of the leaf switches 106. It should be understood that different types of thresholds not necessarily based on average utilization can be used in other embodiments to implement migration decisions within the migration controller 110. Also, a target host device for receiving a migrated virtual machine can be identified using other characteristics in addition to or in place of minimum memory utilization.

In some embodiments, the virtual machines 104 are associated with respective tenants in a data center or other multi-tenant environment. However, it is to be appreciated that other embodiments can be implemented outside of the multi-tenant environment context. Accordingly, embodiments disclosed herein are not limited to multi-tenant environments.

Each of the host devices 102 illustratively comprises at least one processor coupled to a memory. Such host devices are examples of what are more generally referred to herein as "processing devices."

As noted above, the virtual resources in the FIG. 1 embodiment illustratively comprise respective virtual machines 104, but other types of virtual resources can be used in other embodiments. For example, the virtual resources in some embodiments comprise respective Docker containers or other types of Linux containers (LXCs). Such containers are typically implemented on a host device using Linux kernel control groups ("cgroups"). It is also possible that the virtual resources may comprise combinations of virtual machines and containers, such as containers that are each running in a corresponding virtual machine. In arrangements of this type, the containers may be subject to migration between host devices with or without migration of their corresponding virtual machines. Other container arrangements including containers deployed on a bare-metal server may be considered virtual resources subject to migration in illustrative embodiments.

It should also be noted that the migration controller 110 may itself be implemented using virtual resources provided by the host devices 102. For example, the migration controller or a portion thereof may run in a virtual machine or container provided by one of the host devices 102. Additionally or alternatively, a distributed implementation of the migration controller 110 can be implemented using a plurality of virtual machines or containers running on respective ones of the host devices 102.

The virtual resources can be utilized to implement a variety of different types of functionality within the system 100. For example, virtual resources can be used to implement platform-as-a-service (PaaS) or infrastructure-as-a-service (IaaS) functionality in system 100, as well as microservices or converged infrastructure within a data center or other cloud computing and storage system.

The one or more networks 105 in some embodiments are configured to interconnect the host devices 102 with an underlying storage platform, although such a storage platform is not explicitly shown in the figure.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise, for example, storage products such as VNX® and Symmetrix VMAX® storage arrays, software-defined storage products such as ScaleIO™ and ViPR®, flash-based storage arrays such as DSSD™ and XtremIO™, cloud storage products such as Elastic Cloud Storage (ECS), object-based storage products such as Atmos®, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

As another example, at least portions of a given storage platform in some embodiments can comprise converged infrastructure such as VxRail™, VxRack™ or Vblock® converged infrastructure commercially available from VCE, the Virtual Computing Environment Company, an EMC Federation Company.

It is therefore to be appreciated that the particular arrangement of system elements shown in FIG. 1 is for purposes of illustration only. Numerous alternative system configurations, involving other arrangements of additional or alternative elements, can therefore be used to implement migration control functionality for facilitating movement of virtual resources between host devices.

The migration controller 110 and related system components provide a number of significant advantages relating to live and offline migration of virtual machines 104 between the host devices 102. For example, such an arrangement can advantageously avoid a situation in which one of the virtual machines 104 is migrated to one of the host devices 102 that has a relatively low utilization level but is coupled to a congested one of the leaf switches 106. The FIG. 1 embodiment eliminates these and other undesirable virtual machine migrations that might otherwise adversely impact system performance by inadvertently leading to overload conditions on one or more of the leaf switches 106.

Accordingly, network switch overloading attributable to migration of virtual machines, containers or other virtual resources from one host device to another is avoided in illustrative embodiments disclosed herein. Such arrangements advantageously allow for significantly more efficient use of available compute and network resources within a given data center or other type of information processing system.

Figure 2:
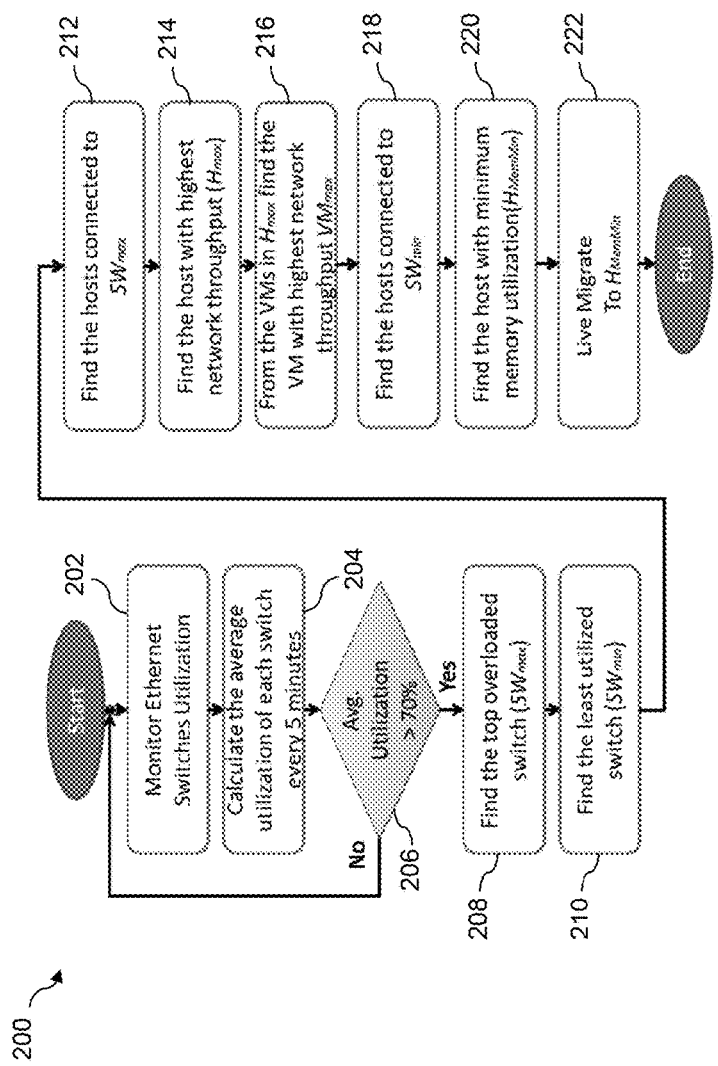
FIG. 2 is a flow diagram of a process for network switch aware virtual resource migration in an illustrative embodiment.

Referring now to FIG. 2, a process 200 for network switch aware migration of virtual machines between host devices is shown. The process includes steps 202 through 222 and is assumed to be performed in the information processing system 100 utilizing host devices 102, virtual machines 104 and migration controller 110, although it can be adapted in a straightforward manner for migration of other types of virtual resources and host devices in other types of information processing systems. Steps 202 through 222 are more particularly assumed to be implemented by the migration controller 110 utilizing its host monitor 112, network monitor 115 and migration decision logic 120.

In step 202, utilization of each of the leaf switches 106 is monitored. As mentioned previously, these leaf switches 106 are assumed to comprise respective Ethernet switches, although other types of switches could be used in other embodiments. Also, additional or alternative network switches could be monitored. In some implementations, the monitoring in step 202 utilizes conventional network monitoring tools.

In step 204, the average utilization of each of the leaf switches 106 is calculated in each of a plurality of time periods. The time periods are illustratively assumed to comprise respective sequential five minute time periods ("every five minutes") in the present embodiment, although other time period arrangements can be used in other embodiments. The average utilization can be calculated for multiple time periods by averaging the individual utilization values determined for respective ones of those multiple time periods. It should be noted that functions other than averaging may be applied to calculate other types of utilization measures in other embodiments. Accordingly, references herein to use of "average utilization" measures should be considered examples only.

In step 206, a determination is made as to whether or not the average utilization of any of the monitored leaf switches 106 is above a specified threshold. A threshold of 70% utilization is used in this embodiment, although this particular value should be considered an illustrative example only. The 70% utilization threshold illustratively represents 70% of a maximum bandwidth that is supported by a given one of the leaf switches 106, and any leaf switch having an average utilization above that particular utilization threshold is considered an "overloaded" leaf switch.

If none of the monitored leaf switches 106 has an average utilization above the 70% utilization threshold, the process returns to step 202 to continue monitoring the utilization of the leaf switches 106. If at least one of the monitored leaf switches 106 is determined to have an average utilization above the 70% utilization threshold, the process transitions to step 208 as indicated in the figure.

In step 208, responsive to an affirmative determination in step 206 that at least one of the network switches has a utilization above the threshold for at least one of the time periods, a most-utilized one of the leaf switches 106 is identified. This most-utilized one of the leaf switches 106 is denoted $SW_{max}$. The most-utilized leaf switch $SW_{max}$ is also referred to in the diagram as the "top overloaded" leaf switch.

In step 210, a least-utilized one of the leaf switches 106 is identified. This least-utilized one of the leaf switches 106 is denoted $SW_{min}$.

In step 212, the host devices 102 that are directly connected to the most-utilized leaf switch $SW_{max}$ are identified.

In step 214, the particular host device having the highest network throughput of the host devices 102 directly connected to the most-utilized leaf switch $SW_{max}$ is identified. This identified host device is denoted $H_{max}$.

In step 216, from the virtual machines running on the host device $H_{max}$, the particular virtual machine having the highest network throughput is selected. The selected virtual machine is denoted $VM_{max}$. This is the particular virtual machine that will be migrated from $H_{max}$ to another host device.

In step 218, the host devices 102 that are directly connected to the least-utilized leaf switch $SW_{min}$ are identified.

In step 220, the particular host device having a minimum memory utilization of the host devices 102 directly connected to the least-utilized leaf switch $SW_{min}$ is identified. This identified host device is denoted $H_{MemMin}$ and is the target host device of the virtual machine migration. This embodiment utilizes memory utilization in combination with network switch utilization in selecting the target host device of the migration, as memory utilization has a substantial impact on virtual machine performance. Other criteria can be used in selecting target host devices in other embodiments. These criteria in some embodiments can include one or more criteria utilized in an otherwise conventional virtual machine migration process, such as VMware® Distributed Resource Scheduling (DRS).

In step 222, a live migration of the selected virtual machine $VM_{max}$ from the host device $H_{max}$ to the host device $H_{MemMin}$ is performed.

Accordingly, in this illustrative embodiment the selected virtual machine $VM_{max}$ is migrated, from the host device $H_{max}$ having the highest network throughput of the host devices directly connected to the most-utilized leaf switch $SW_{max}$, to the host device $H_{MemMin}$ having the lowest memory utilization of the host devices directly connected to the least-utilized leaf switch $SW_{min}$.

The process 200 then ends as indicated in the figure. Additional live migrations of other virtual machines 104 between other host devices 102 may then occur as needed based on the monitoring and calculating in respective steps 202 and 204 and the corresponding utilization determination in step 206.

As mentioned previously, although leaf switches 106 are monitored in this embodiment, and the identified host devices are those host devices 102 directly connected to particular ones of the leaf switches 106, other arrangements are possible in other embodiments. For example, additional or alternative network switches may be monitored. Also, other types of interconnections may be used in identifying host devices as sources and targets of migrated virtual resources in other embodiments.

As a more particular example, references in the FIG. 2 embodiment to a most-utilized network switch or a least-utilized network switch can be replaced in other embodiments with a relatively high utilization network switch and relatively low utilization network switch, respectively. Such embodiments therefore need not necessarily determine the most-utilized network switch or least-utilized network switch in respective steps 208 and 210, but could instead choose a different relatively high utilization network switch and a different relatively low utilization network switch, respectively, possibly applying other selection criteria in addition to network utilization. Such other selection criteria may include, for example, an amount of time elapsed since a previous migration to or from a host device associated with the particular network switch at issue.

The particular processing operations and other system functionality described in conjunction with the flow diagram of FIG. 2 are therefore presented by way of illustrative example only, and should not be construed as limiting the scope of the invention in any way. Alternative embodiments can use other types of processing operations to provide network switch aware migration functionality for virtual machines, containers or other virtual resources of an information processing system. For example, the ordering of the process steps may be varied in other embodiments, or certain steps may be performed concurrently with one another rather than serially. Also, one or more of the process steps may be repeated periodically for different processing scenarios, or performed in parallel with one another. For example, parallel instantiations of one or more of the process steps can be implemented for migration of different virtual resources within the system.

Network switch aware migration functionality such as that described in conjunction with the flow diagram of FIG. 2 can be implemented at least in part in the form of one or more software programs stored in memory and executed by a processor of a processing device such as a computer or server. For example, the migration controller 110 may be implemented as one or more software programs configured to run on underlying hardware of one or more of the host devices 102. As will be described below, a memory or other storage device having executable program code of one or more software programs embodied therein is an example of what is more generally referred to herein as a "processor-readable storage medium."

Figure 3:
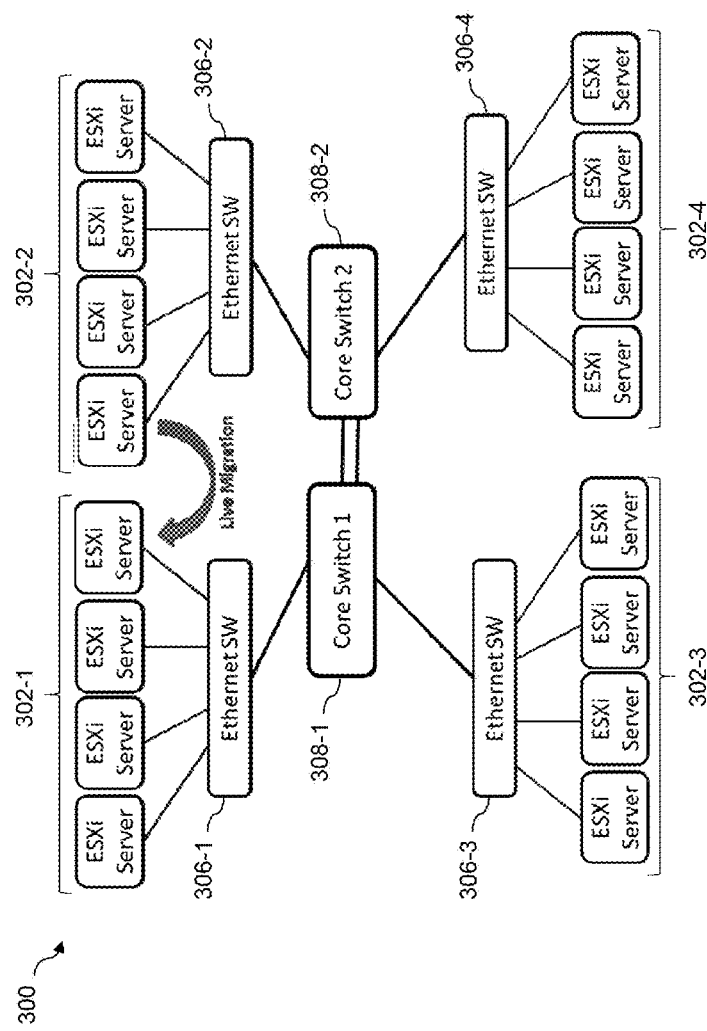
FIG. 3 shows another illustrative embodiment of an information processing system configured to support network switch aware virtual resource migration.

Referring now to FIG. 3, an information processing system 300 is configured to support network switch aware migration of virtual resources in an illustrative embodiment. In this embodiment, system 300 comprises a plurality of sets of host devices 302-1, 302-2, 302-3 and 302-4. Each of the host devices 302 is more particularly implemented as an ESXi server comprising a VMware® vSphere® hypervisor supporting multiple virtual machines that are not explicitly shown in the figure. These virtual machines are migratable between the host devices 302. For example, a given virtual machine can be subject to live migration from one of the ESXi servers to another one of the ESXi servers as illustrated by the live migration arrow in the figure. Other types of migration can be used in other embodiments.

The system 300 further comprises one or more networks comprising a plurality of network switches each coupled to one or more of the host devices 302. The network switches in this embodiment illustratively comprise Ethernet switches 306-1, 306-2, 306-3 and 306-4, each of which is coupled to one or more of the host devices 302. The Ethernet switches 306 may be viewed as examples of what are also referred to elsewhere herein as "leaf switches." The one or more networks further include additional switches comprising core switches 308-1 and 308-2, also denoted as Core Switch 1 and Core Switch 2, respectively. Each of the core switches 308 is coupled to one or more of the Ethernet switches 306. As in the FIG. 1 embodiment, it is to be appreciated that the particular types and arrangements of network switches 306 and 308 shown in the FIG. 3 embodiment are presented by way of illustrative example only, and numerous other types and arrangements of network switches of one or more networks may be used in other embodiments.

It is assumed that the system 300 further comprises a migration controller that is similar to the migration controller 110 previously described in conjunction with the embodiments of FIGS. 1 and 2, although such a migration controller is not explicitly shown in FIG. 3. For example, a migration controller may be implemented in a distributed manner across at least a subset of the host devices 302 in the FIG. 3 embodiment. The operation of system 300 is therefore similar to that of system 100.

A simulation of one possible implementation of the FIG. 3 embodiment was performed in order to illustrate certain performance advantages. In the simulation, the parameters of the system implementation were as listed in Table 1 below.

TABLE 1

Example Simulation Parameters

| | |
|---|---|
| Number of Ethernet SWs | 4 (1 GB Switch) |
| Number of Hosts per Ethernet SW | 4 |
| Number of VMs on each Host (initially) | 5 |
| Network Utilization Mean per VM | Varies (5 – 50 Mbps) |
| Memory Utilization Mean per VM | 100 MB |
| SW Utilization Threshold | 70% |

The simulation results indicate that virtual machines on host devices connected to overloaded switches above the switch utilization threshold are effectively migrated to switches having lower levels of utilization. As a result, the network utilization after application of the network switch aware migration was found to be better balanced across the Ethernet switches 306 such that network bottlenecks were avoided. More particularly, prior to application of the network switch aware migration, two of the four Ethernet switches 306 were over the utilization threshold and the remaining two were under the threshold, causing an imbalance in network performance. After application of the network switch aware migration, all four of the Ethernet switches 306 were under the threshold.

It should again be noted that the particular arrangement of components in the system of FIG. 3, like that of the system 100 of FIG. 1, is presented by way of illustrative example only, and should not be construed as limiting in any way. As noted above, the described functionality can be implemented using additional or alternative components. Accordingly, a wide variety of host devices, virtual resources, migration controllers and other associated components can be used in other embodiments.

As indicated elsewhere herein, illustrative embodiments can provide a number of significant advantages relative to conventional arrangements.

For example, in some of these embodiments, network switch overloading attributable to migration of virtual machines, containers or other virtual resources from one host device to another is avoided. Such arrangements advantageously allow for significantly more efficient use of available compute and network resources within a given data center or other type of information processing system.

In some embodiments, network switch aware migration takes into account both network switch utilization and host device utilization in making migration decisions, leading to reduced network congestion and improved virtual resource performance. Accordingly, load balancing across network switches of a given system is considerably enhanced and network bottlenecks and their associated delays are avoided.

As another example, one or more illustrative embodiments are advantageously configured to facilitate migration of virtual machines, containers or other virtual resources in data centers in which it is important to optimize resource utilization in order to meet service level agreements. For example, these embodiments allow virtual resources to be migrated across racks or other types of infrastructure within a given data center, thereby providing enhanced efficiency and flexibility in virtual resource deployments.

The network switch aware migration functionality in some embodiments is applied to live migration of virtual machines and is therefore performed without any significant disruption to provision of cloud-based services.

Illustrative embodiments can provide significant enhancements to existing virtual resource migration functionality such as that provided by VMware® DRS or other similar conventional processes.

It is to be appreciated that the foregoing advantages are illustrative of advantages provided in certain embodiments, and need not be present in other embodiments.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative virtual resource processing environments can be used in other embodiments.

Also, the particular processing operations and other system functionality described in conjunction with the flow diagram of FIG. 2 are presented by way of illustrative example only, and should not be construed as limiting the scope of the invention in any way. Alternative embodiments can use other types of processing operations involving other information processing system components.

It is to be appreciated that network switch aware virtual resource migration functionality such as that described in conjunction with the illustrative diagrams of FIGS. 1 through 3 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises virtual machines implemented using one or more hypervisors and may additionally comprise other virtualization infrastructure such as containers running in the virtual machines. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, host devices, virtual resources and migration controllers. Also, the particular configurations of system and device elements shown in FIGS. 1 and 3 and the processing operations in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. An apparatus comprising:
a plurality of host devices each implementing one or more virtual resources that are migratable between the host devices;
one or more networks comprising a plurality of network switches each coupled to one or more of the host devices; and
a migration controller associated with one or more of the host devices;
wherein the migration controller is configured to monitor utilization of the network switches by their associated host devices and to direct migration of the virtual resources between the host devices based at least in part on the monitored utilization of the network switches;
wherein responsive to detection of a first network switch having a utilization above a threshold, the migration controller identifies a second network switch having a utilization below the threshold and directs migration of at least one of the virtual resources from a first one of the host devices associated with the first network switch to a second one of the host devices associated with the second network switch; and
wherein the second host device is selected from multiple host devices associated with the second network switch based at least in part on memory utilization of the second host device relative to memory utilizations of respective other ones of the multiple host devices associated with the second network switch;

the migration of the one or more virtual resources from the first host device to the second host device thereby being controlled as a function of both network switch utilization and host device memory utilization.

2. The apparatus of claim 1 wherein a given one of the host devices comprises at least one processor coupled to at least one memory and wherein at least a portion of the migration controller is implemented by said at least one processor executing software stored in said at least one memory.

3. The apparatus of claim 1 wherein the virtual resources comprise at least one of virtual machines and containers.

4. The apparatus of claim 1 wherein at least a subset of the network switches comprise respective Ethernet switches.

5. The apparatus of claim 1 wherein the migration controller is further configured to monitor utilization of the host devices and to direct migration of the virtual resources between the host devices based at least in part on the monitored utilization of the network switches and the monitored utilization of the host devices.

6. The apparatus of claim 1 wherein the migration controller is configured to monitor utilization of the network switches by their associated host devices by determining an average utilization of each network switch over a particular time period.

7. The apparatus of claim 1 wherein the migration controller is configured to detect a given network switch having a utilization above a threshold by comparing an average utilization of that switch determined for a particular time period to an average utilization threshold.

8. The apparatus of claim 1 wherein the migration controller is configured to identify the second host device as a host device having a minimum memory utilization among multiple ones of the host devices associated with the second network switch.

9. The apparatus of claim 1 wherein the migration controller is configured:

to determine utilization of each of the network switches in each of a plurality of time periods;

responsive to at least one of the network switches having a utilization above the threshold for at least one of the time periods, to identify a most-utilized one of the network switches and a least-utilized one of the network switches;

to identify the host devices associated with the most-utilized network switch;

to identify the host devices associated with the least-utilized network switch;

to select a virtual resource from a given one of the host devices associated with the most-utilized network switch; and to direct migration of the selected virtual resource from the given host device associated with the most-utilized network switch to a given one of the host devices associated with the least-utilized network switch.

10. The apparatus of claim 9 wherein the migration controller in selecting a virtual resource from a given one of the host devices associated with the most-utilized network switch is further configured:

to identify the host device having a highest network throughput of the host devices associated with the most-utilized network switch;

to identify virtual resources of the host device having the highest network throughput of the host devices associated with the most-utilized network switch; and to select from the identified virtual resources the virtual resource having the highest network throughput.

11. The apparatus of claim 9 wherein the migration controller in directing migration of the selected virtual resource from the given host device associated with the most-utilized network switch to a given one of the host devices associated with the least-utilized network switch is further configured:

to identify the host device having a lowest memory utilization of the host devices associated with the least-utilized network switch; and to direct migration of the selected virtual resource from the host device having the highest network throughput of the host devices associated with the most-utilized network switch to the host device having the lowest memory utilization of the host devices associated with the least-utilized network switch.

12. The apparatus of claim 1 wherein migration of at least one of the virtual resources from the first one of the host devices associated with the first network switch to the second one of the host devices associated with the second network switch comprises a live migration of the virtual resource.

13. A method comprising:

monitoring utilization of a plurality of network switches each coupled to one or more of a plurality of host devices implementing virtual resources that are migratable between the host devices; and controlling migration of the virtual resources between the host devices based at least in part on the monitored utilization of the network switches;

wherein responsive to detection of a first network switch having a utilization above a threshold, a second network switch having a utilization below the threshold is identified and at least one of the virtual resources is migrated from a first one of the host devices associated with the first network switch to a second one of the host devices associated with the second network switch; and wherein the second host device is selected from multiple host devices associated with the second network switch based at least in part on memory utilization of the second host device relative to memory utilizations of respective other ones of the multiple host devices associated with the second network switch;

the migration of the one or more virtual resources from the first host device to the second host device thereby being controlled as a function of both network switch utilization and host device memory utilization.

14. The method of claim 13 wherein the monitoring and controlling further comprise:

determining utilization of each of the network switches in each of a plurality of time periods;

responsive to at least one of the network switches having a utilization above the threshold for at least one of the time periods, identifying a most-utilized one of the network switches and a least-utilized one of the network switches;

identifying the host devices associated with the most-utilized network switch;

identifying the host devices associated with the least-utilized network switch;

selecting a virtual resource from a given one of the host devices associated with the most-utilized network switch; and migrating the selected virtual resource from the given host device associated with the most-utilized network switch to a given one of the host devices associated with the least-utilized network switch.

15. The method of claim 14 wherein selecting a virtual resource from a given one of the host devices associated with the most-utilized network switch comprises:
   identifying the host device having a highest network throughput of the host devices associated with the most-utilized network switch;
   identifying virtual resources of the host device having the highest network throughput of the host devices associated with the most-utilized network switch; and
   selecting from the identified virtual resources the virtual resource having the highest network throughput.

16. The method of claim 14 wherein migrating the selected virtual resource from the given host device associated with the most-utilized network switch to a given one of the host devices associated with the least-utilized network switch comprises:
   identifying the host device having a lowest memory utilization of the host devices associated with the least-utilized network switch; and
   migrating the selected virtual resource from the host device having the highest network throughput of the host devices associated with the most-utilized network switch to the host device having the lowest memory utilization of the host devices associated with the least-utilized network switch.

17. A computer program product comprising a non-transitory processor-readable storage medium having stored therein program code of one or more software programs, wherein the program code when executed by at least one processing device causes said at least one processing device:
   to monitor utilization of a plurality of network switches each coupled to one or more of a plurality of host devices implementing virtual resources that are migratable between the host devices; and
   to control migration of the virtual resources between the host devices based at least in part on the monitored utilization of the network switches;
   wherein responsive to detection of a first network switch having a utilization above a threshold, a second network switch having a utilization below the threshold is identified and at least one of the virtual resources is migrated from a first one of the host devices associated with the first network switch to a second one of the host devices associated with the second network switch; and
   wherein the second host device is selected from multiple host devices associated with the second network switch based at least in part on memory utilization of the second host device relative to memory utilizations of respective other ones of the multiple host devices associated with the second network switch;
   the migration of the one or more virtual resources from the first host device to the second host device thereby being controlled as a function of both network switch utilization and host device memory utilization.

18. The computer program product of claim 17 wherein the program code when executed by said at least one processing device further causes said at least one processing device:
   to determine utilization of each of the network switches in each of a plurality of time periods;
   responsive to at least one of the network switches having a utilization above the threshold for at least one of the time periods, to identify a most-utilized one of the network switches and a least-utilized one of the network switches;
   to identify the host devices associated with the most-utilized network switch;
   to identify the host devices associated with the least-utilized network switch;
   to select a virtual resource from a given one of the host devices associated with the most-utilized network switch; and
   to migrate the selected virtual resource from the given host device associated with the most-utilized network switch to a given one of the host devices associated with the least-utilized network switch.

19. The computer program product of claim 18 wherein selecting a virtual resource from a given one of the host devices associated with the most-utilized network switch comprises:
   identifying the host device having a highest network throughput of the host devices associated with the most-utilized network switch;
   identifying virtual resources of the host device having the highest network throughput of the host devices associated with the most-utilized network switch; and
   selecting from the identified virtual resources the virtual resource having the highest network throughput.

20. The computer program product of claim 18 wherein migrating the selected virtual resource from the given host device associated with the most-utilized network switch to a given one of the host devices associated with the least-utilized network switch comprises:
   identifying the host device having a lowest memory utilization of the host devices associated with the least-utilized network switch; and
   migrating the selected virtual resource from the host device having the highest network throughput of the host devices associated with the most-utilized network switch to the host device having the lowest memory utilization of the host devices associated with the least-utilized network switch.

* * * * *